Nov. 16, 1965     J. E. ADAMS     3,217,772

FRONT END MOUNTING CAGE NUT FASTENER

Filed April 17, 1964

INVENTOR.
JAMES E. ADAMS
BY
*Fraser & Fraser*
ATTORNEYS

United States Patent Office 3,217,772
Patented Nov. 16, 1965

3,217,772
FRONT END MOUNTING CAGE NUT
FASTENER
James E. Adams, Toledo, Ohio, assignor, by mesne assignments, to The Bishop and Babcock Corporation, Toledo, Ohio, a corporation of Ohio
Filed Apr. 17, 1964, Ser. No. 360,502
1 Claim. (Cl. 151—41.75)

This invention relates to fasteners which are adapted to receive a screw-threaded member and are in the form of a separate piece applied to and retained by a supporting panel to which a supported panel is attached at another time. Somewhat similar fasteners are shown in U.S. Patents Nos. 2,273,648; 2,302,389; and 3,980,311.

An object is to produce a fastener of the above character which is simpler in construction and assembly than those heretofore in use so that cost is reduced, and which affords extensive floating movement of the nut element in order to receive a screw more readily despite misalignment of the parts to be connected.

Other objects and advantages of the invention will hereinafter appear and, for purposes of illustration but not of limitation, an embodiment of the invention is shown on the accompanying drawings, in which—

Figures 6, 7:
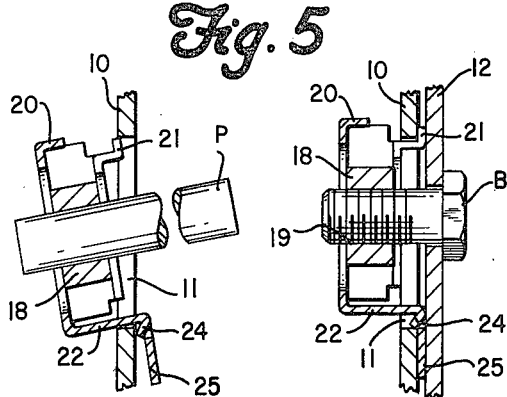
FIGURE 6 is a longitudinal sectional view of a fragment of the supporting panel and the fastener and showing the manner in which a drift pin is employed for rocking the fastener into position of use.
FIGURE 7 is a longitudinal sectional view showing the fastener mounted within the supporting panel aperture and the supported panel arranged adjacent thereto and secured in place.
Figure 3:
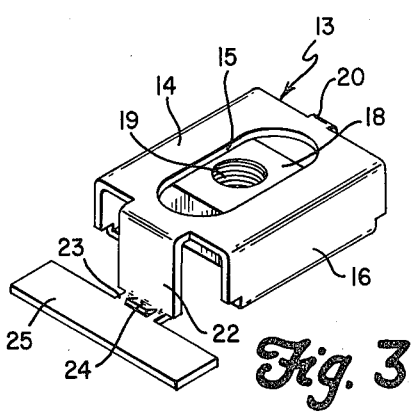
FIGURE 3 is an enlarged top perspective view of the front end mounted cage nut fastener.

The illustrated embodiment of the invention comprises a sheet metal supporting panel 10, which is provided with a longitudinally elongate rectangular hole 11 for receiving the fastener. As indicated in FIGURE 7, when the front end mounted cage nut fastener is in position of use a bolt B is applied from the other side for connecting the supported panel 12 to the supporting panel 10.

The fastener, in accordance with this invention, is known as a front end fastener which enables the fastener to be applied from one side of the supporting panel with the screw or bolt receiving nut disposed on the opposite side. The fastener may be applied well in advance of the time when the bolt is applied and is reliably held in position in a manner which will hereinafter appear.

The fastener is preferably of low carbon steel and is formed of a single piece of sheet metal which is inexpensive and has a slight degree of flexible resilience. The cage body 13 is formed with a rectangular oblong flat bottom wall 14 which is substantially wider than the panel aperture 11. As shown, the wall 14 has a centrally disposed longitudinally extending elongate hole 15 the ends of which are rounded and through this hole, as will hereinafter appear, extends the bolt for securing a supported panel 12 to the supporting panel 10.

Integral with and coextensive with the side edges of the wall 14 are side walls 16, which are bent at right angles to the plane of the wall 14. Integral with the free edges of the side walls 16 and extending inwardly therefrom in parallel relationship to the wall 14 are substantially equal top wall sections 17, the end edges of which are spaced equidistantly inwardly from the side edges of the side walls 16. The free or longitudinal side edges of the wall sections 17 are spaced apart and the free edge of each section is contoured at the outer end in a curvilinear manner to correspond to the adjacent end of the slot 15. The adjacent side or free edges of the wall sections 17 are parallel to each other at the inner end and are spaced apart approximately the same distance as the longitudinal side edges of the slot 15 in the panel 14.

It will thus be understood that the bottom wall 14, the side walls 16 and the top wall sections 17 provide a guideway in which is disposed an oblong rectangular nut 18 having a centrally disposed screw-threaded hole 19. The nut can shift freely substantially throughout the length of the slot 15, thereby to accommodate variations or discrepancies in the assembly arrangements. It will be seen that the nut 18 has a greater length as measured between the side walls 16 than the lateral dimension, thus affording a substantial support for the nut and preventing its turning within the cage but allowing free shifting movement.

Providing a stop for limiting the movement of the nut 18 in one direction is a tab 20 which is centrally disposed with respect to the wall 14, is integral therewith and extends at substantially right angles therefrom.

On the free edge of each of the top wall sections 17 and arranged relatively close to each other are integral L-shaped tongues 21, the free edges of which extend outwardly away from the wall sections 17 and in parallel relation thereto. The purpose of these tongues will be more fully described hereinafter.

Integral with the opposite end of the wall 14 and arranged centrally thereof is an arm 22 which is of a width approximately one-half the width of the wall 14 and extends at right angles to the plane of the wall 14. The arm 22 projects a distance somewhat above the top wall sections 17 and terminates in about the same plane as that of the outer ends of the L-shaped tongues 21. Integral with the free end of the arm 22 and extending outwardly therefrom at approximately right angles thereto is a neck 23, the width of which is somewhat less than the width of the arm 22. Formed centrally of the reduced neck 23 and disposed centrally thereof is a downwardly inclined struck-out finger or detent 24. Integral with the neck 23 is a flat tongue 25 which is of substantial width and of a length somewhat greater than the width of the cage body, so that the ends thereof project respectively beyond the sides of the cage body.

From the above it will be understood that the arm 22 provides a stop for limiting the shifting movement of the nut 18 in one direction, and the tab 20 serves as a stop to prevent movement of the nut in the opposite direction. The sides of the nut ride freely along the side walls 16 of the cage, sufficient clearance being afforded for this purpose.

Figure 1:
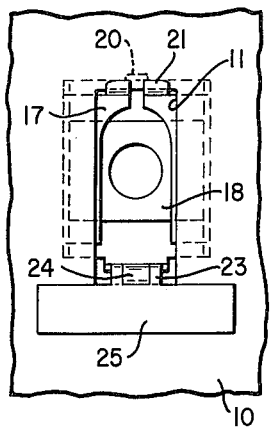
FIGURE 1 is a top plan view of a fragment of a supporting panel showing the front end mounted cage nut fastener in position of use.
Figure 2:
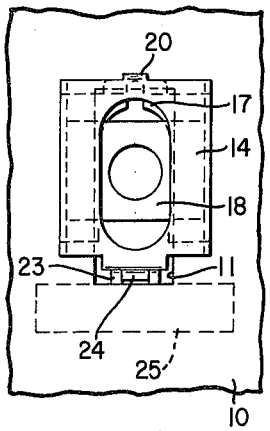
FIGURE 2 is similar to FIGURE 1 but constitutes a view of the assembly looking at the under side of the supporting panel.
Figure 4:
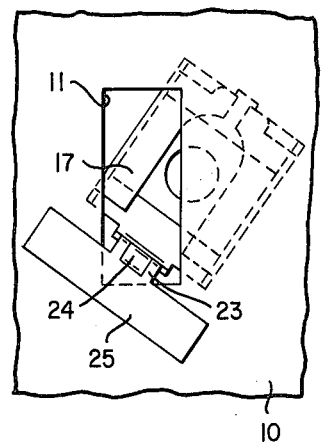
FIGURE 4 is a top plan view of a fragment of a supporting panel showing a preliminary step in mounting the fastener within the panel aperture.
Figure 5:
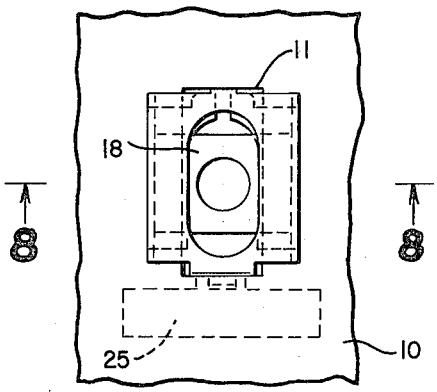
FIGURE 5 is a plan view of a fragment of the underside of the supporting panel showing the next step in the mounting of the fastener within the panel opening.
Figure 8:
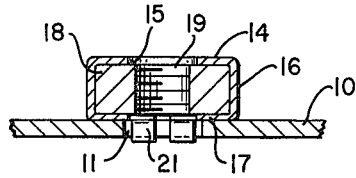
FIGURE 8 is a transverse sectional view substantially on the line 8—8 of FIGURE 5.

In applying the fastener to the supporting panel 10 the tongue 25 is grasped and the cage nut and associated structure is inserted through the longer dimension of the panel opening 11, so that the body of the cage nut is disposed on the inner side of the panel 10, as indicated on FIGURE 4. The fastener is then rocked to position the cage nut on the inner side of the supporting panel and the reduced arm 22 enables such rocking or turning movement to be accomplished. The fastener is positioned until the L-shaped tongues are disposed juxtaposed to the inner edge of the panel aperture and in proper registry therewith. In this position the portion of the fastener adjacent the tongue 25 is in close juxtaposition to the adjacent end of the panel opening 11. The next operation is to shift the fastener bodily toward the opposite end of the opening 11 and to move the L-shaped tongues 21 into overlapping engagement with the outer side of the supporting panel 10 in the region of the opposite edge of the opening. To accomplish the positioning of the tongue 25 in overlapping relation with the outer side of the panel 10, some flexing of the reduced neck 23 is necessary and for this purpose there is sufficient flexibility to retain the fastener in position when the L-shaped tongues 21 have been moved to their final panel-overlapping position. This action can thus be effected by the use of a drift pin P, as indicated on FIGURE 6, which extends through the hole in the nut 18 and provides a handle to effect the flexing and shifting actions. Such shifting is effected until the detent 24 snaps into the position shown on FIGURE 7 to engage the adjacent edge of the panel aperture 11. It will be apparent that the lonigtudinal shifting movement of the fastener in one direction is limited by the L-shaped tongues 21 and in the opposite direction by the detent 24 which snaps into position to abut against the opposite end of the panel opening 11.

From the above description it will be manifest that the fastener can be readily applied to the supporting panel provided with a single assembly slot and through which the bolt B extends for securing the supported panel 12 to the supporting panel 10. Usually a number of these fasteners are provided where the panel is of any substantial size. One important feature of the invention resides in the formation of the fastener from inexpensive sheet metal, such as carbon steel, for example SAE 1050. This is a relatively inexpensive material but has sufficient flexibility to enable application of the fastener to the suporting panel. On the other hand it has sufficient rigidity securely and reliably to hold and retain the fastener in its applied position. The relatively long guideway for the nut 18 enables it to slide freely to one position or another to accommodate the bolt regardless of variations or inaccuracies in the assembly arrangement. A further important feature of the fastener is that it can be manufactured economically on a quantity production basis.

Changes in details of construction and arrangement may be effected without departing from the spirit of the invention, particularly as defined in the appended claim.

What I claim is:

A fastener for mounting in an opening in a supporting panel comprising a sheet metal body wider than the panel opening for insertion therethrough from the upper side to overlap the inner side thereof, said body having a bottom wall formed with an elongate opening, integral side walls extending upwardly at right angles to said bottom wall, inwardly extending top wall sections integral with said side walls, the free edges of said sections being spaced from each other to form a slot substantially in registry with said bottom wall opening, a tab on one end of said bottom wall extending toward said top wall sections, an arm integral with the central portion of said bottom wall and extending upwardly slightly beyond the upper edges of said side walls, said arm being approximately one-half the width of said top wall, a reduced neck on the end of said arm extending outwardly at right angles from same, a downwardly extending spring tab on said neck, a tongue integral with said neck and disposed transversely with relation to said body with the ends extending beyond said side walls, L-shaped tongue members on the free edges of said top wall sections at the end opposite to said arm and extending away from said top wall sections with the ends thereof generally parallel to said top wall sections and in generally the same plane as said tongue, and a nut body shiftable in said body, said nut body having generally flat sides and ends with the ends juxtaposed to said sheet metal body side walls and limited in one direction of movement by said tab and in the opposite direction by said integral tongue, the sidewise dimension of said nut being substantially less than the distance between said tab and integral tongue.

References Cited by the Examiner
UNITED STATES PATENTS

| | | | |
|---|---|---|---|
| 1,594,412 | 8/1926 | Garvin | 151—41.78 |
| 2,908,311 | 10/1959 | Garman | 151—41.75 |

EDWARD C. ALLEN, *Primary Examiner.*